March 13, 1962     D. O. NASH     3,024,605
THRUST REVERSER
Filed Dec. 18, 1959     2 Sheets-Sheet 1
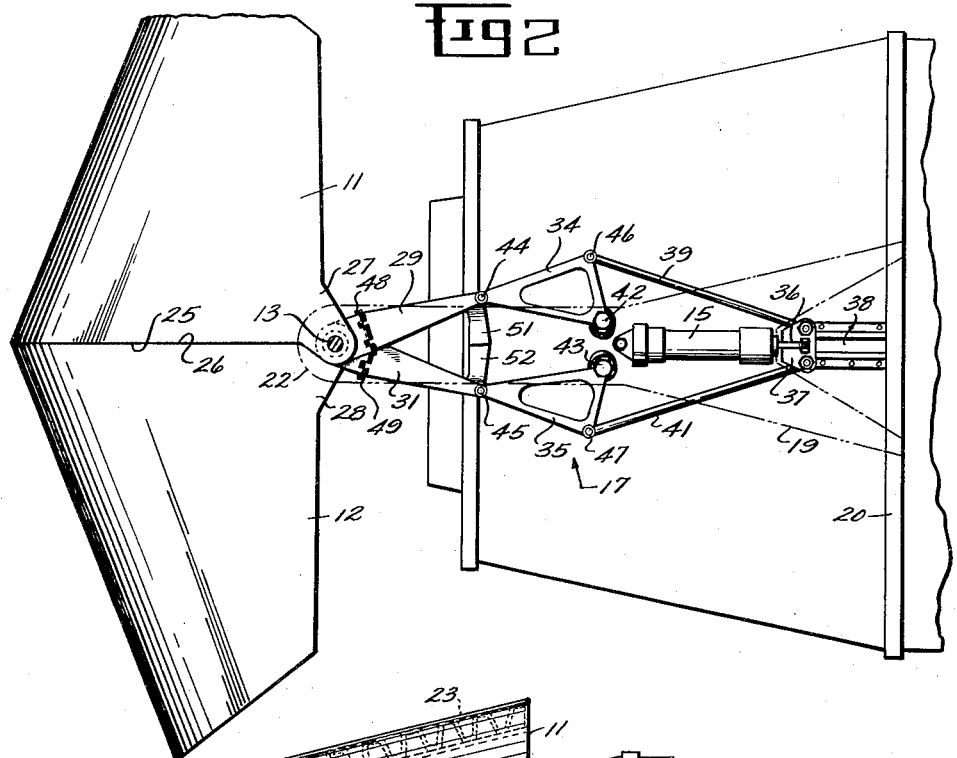
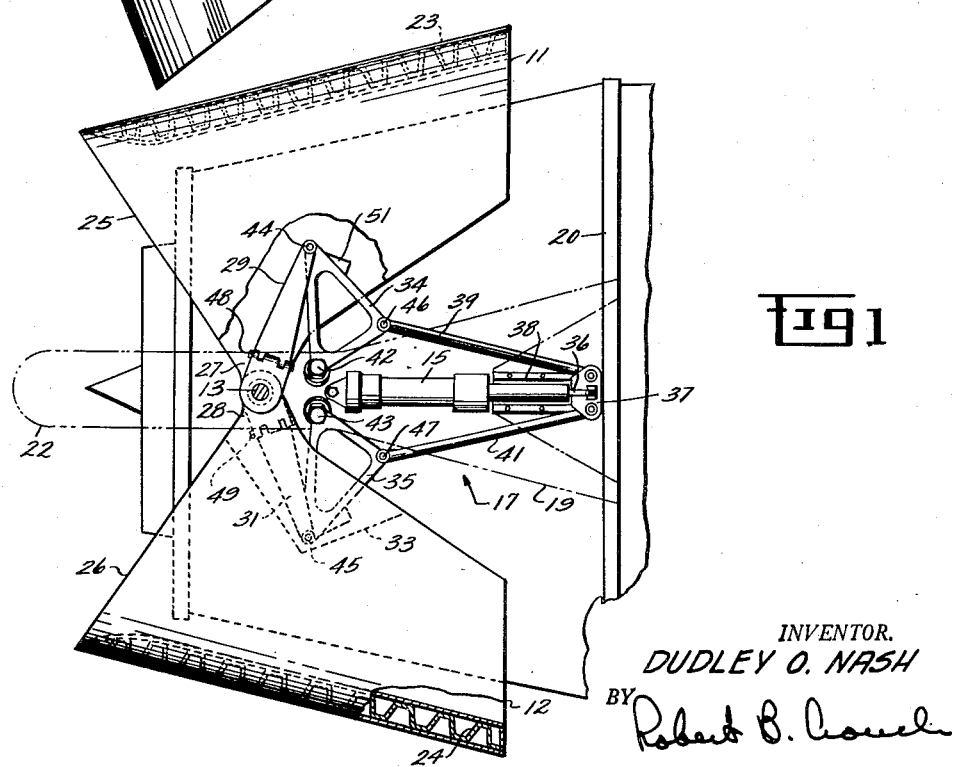
INVENTOR.
DUDLEY O. NASH
BY
ATTORNEY- March 13, 1962  D. O. NASH  3,024,605
THRUST REVERSER
Filed Dec. 18, 1959   2 Sheets-Sheet 2
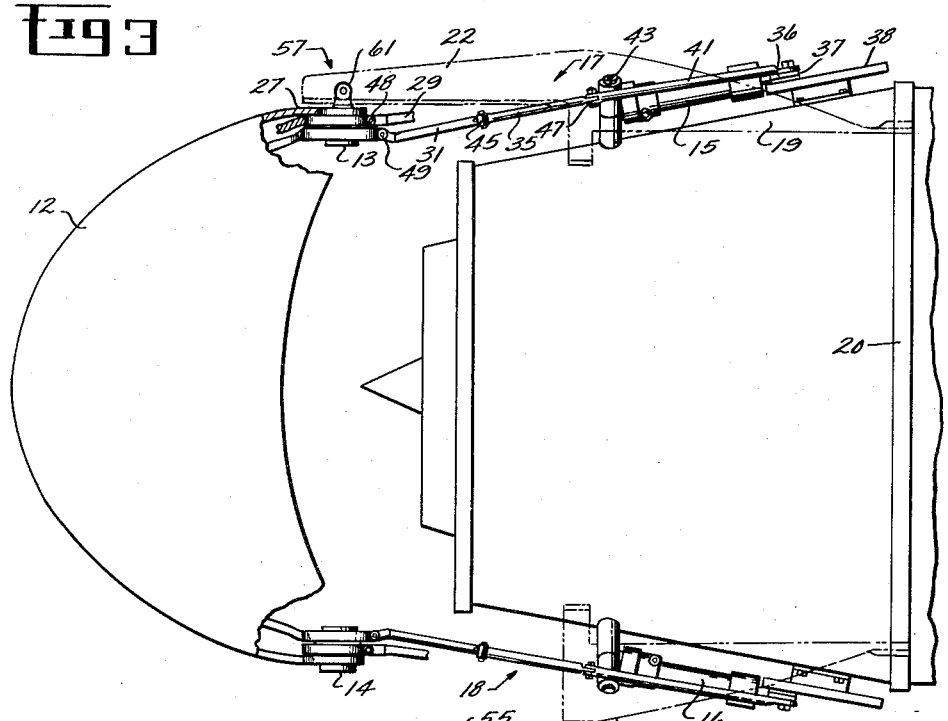
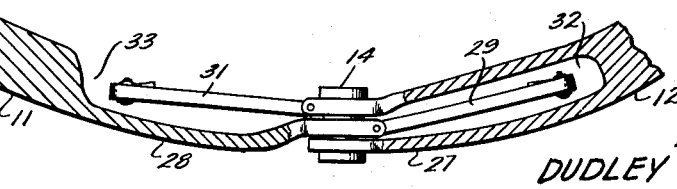
INVENTOR.
DUDLEY O. NASH
BY Robert B. Crouch
ATTORNEY—

United States Patent Office 3,024,605
Patented Mar. 13, 1962

3,024,605
THRUST REVERSER
Dudley O. Nash, Cincinnati, Ohio, assignor to General Electric Company, a corporation of New York
Filed Dec. 18, 1959, Ser. No. 860,590
6 Claims. (Cl. 60—35.54)

The present invention relates to a thrust reverser for an aircraft propulsion plant and more particularly to a reverser of the target type which is suitable for use with an aft-fan jet engine.

A variety of designs have been proposed for deviating the direction of thrust of an aircraft jet engine to a generally sideward and forward direction, so that a thrust component is available for deceleration of the aircraft. One of the general types of known reversers is that in which the engine exhaust duct is mechanically blocked to deflect the exhaust gases and spoil or reverse the thrust. Many configurations of this type of reverser have been proposed, but none have been particularly suitable for use with an aft-fan jet engine which includes a turbine driven fan or compressor connected to the turbine discharge section of a gas generator, such as a gas turbine engine. In such an engine the exhaust gases of the gas generator drive the fan to discharge a large mass of relatively slow moving air which surrounds the gas generator exhaust gases. For effective spoiling or reversal of an aft-fan engine, the discharge gases from the gas generator and the fan must both be deflected. Since free egress of the gas generator and fan discharge gases is required for efficient performance of the engine, physical deflection of the gas streams must be performed in the atmosphere downstream of the exhaust nozzles of the engine. This requires a reverser which under operative conditions extends a sufficient distance downstream of the exhaust nozzles to allow turning of the gas streams. For efficient engine performance when the reverser is in a nonoperative position, the reverser should be capable of being stored out of the air stream to present an aerodynamically clean aircraft or nacelle surface. In addition, since the fan has a larger diameter than the gas generator the reverser apparatus must be capable of being stored in a narrow confined space to hold the overall engine diameter to a minimum.

The object of the present invention is to provide a thrust reverser particularly suitable for use with an aft-fan jet engine, the reverser employing a common system for supporting and positioning the gas stream reversing mechanism.

The present invention relates to a two position thrust reverser particularly adapted for use with an aft-fan aircraft propulsion engine. The reverser includes two blocker doors for reversing the gas stream and which fair into the nacelle structure to form a continuous aerodynamic surface in their stowed or nonoperative position. The doors are supported and positioned by a common system which includes a monorail secured to the engine or aircraft. Movement of the doors from the nonoperative to the revrese thrust position is accomplished in a simultaneous translating and rotating action by a motion multiplying linkage as the blocker doors are moved aft on the monorail. The monorail acts as a beam to support the blocker doors during the translating motion and to take the vertical loads of the blockers while in the reverse thrust position.

Other objects and many of the attendant advantages of this invention will be readily appreciated as the same becomes better understood by reference to the following detailed description when considered in connection with the accompanying drawings wherein:

FIG. 1 is a plan view partly in section of the thrust reverser of the present invention in its stowed or nonoperative position.

FIG. 2 is a plan view of the reverser in its reverse thrust position.

FIG. 3 is an elevation view partly in section of the reverser in its reversed thrust position; and FIG. 4 is a sectional view at an enlarged scale showing the interconnection between the blocker doors and the manner of their attachment to the monorail.

As illustrated in FIGS. 1 and 3, the thrust reverser of the present invention includes two blocker doors 11 and 12 which are hinged together on the vertical center line of the engine by pins 13 and 14. Actuation of the doors is accomplished by synchronized actuators 15 and 16 acting through motion multiplying linkages 17 and 18 at the top and bottom vertical center line. The actuators and linkages are mounted on support beams 19 and 21 which are secured to the structural frame of the engine illustrated at 20. Beam 19 is provided with a monorail extension 22 which acts as a guide and support for the blocker doors.

The blocker doors have the form of opposed segments of a frustum of a cone with the downstream edges 25 and 26 of the doors lying at acute angles to the outer surfaces of the respective doors. Each blocker door is a double-skin structure with stiffeners 23 and 24 separating the inner and outer skins to provide increased strength and resistance to distortion. Bearing plates 27 and 28 are welded or otherwise secured to each blocker door at the two circumferential extremities. The bearings for both doors are stacked concentrically, and joined by pins 13 and 14, thus providing a single pivot point top and bottom. The blocker door bearing plates include elongated extensions 29 and 31, each of which forms a crank arm and acts as one of the links of the actuating mechanism. When assembled, as indicated in FIG. 2, the crank arm 29 from one blocker plate crosses that 31 of the other, thus forming a scissors type action to open and close the doors. As illustrated in FIG. 4, bearing plates 27 are so designed that they form a clevis while bearing plates 28 form a lug, thus making each of the bearing journals a double shear design. Both blocker doors are therefore identical. Recesses 32 and 33 in the bearing plates provide open paths for the crank arms 29 and 31 to sweep during their full travel, thus allowing a smooth external surface to be exposed to the air stream.

The actuating mechanism consists of two hydraulic actuators 15 and 16, each of which is connected to a pair of bellcranks 34 and 35 through a slider, track and link arrangement. Only the upper one of these mechanisms will be described, it being understood that the remaining mechanism is similar in all respects. The actuators illustrated are of the piston type and are connected to the support beams such that the rod end of the piston is used to extend the reverser to the reversed thrust position and the head end is used for retraction, the highest actuating force occurring on the retraction stroke. The actuator rod 36 of the actuator 15 is connected to a slider 37 which in turn slides on a track 38 mounted securely on the support beam 19. This slider is in the form of a T head, each side of the T providing a connecting point for one of the links 39 and 41 which are in turn connected to the bellcranks 34 and 35. The bellcranks act as the intermediate elements in the linkage between the actuators and the doors. Each bellcrank is provided with three pivot points, the intermediate points of the respective bellcranks being mounted on the support beam by pins 42 and 43. The rearmost points are connected to the crank arms 29 and 31 respectively at 44 and 45, and the remaining points are connected to the links 39 and 41 at 46 and 47. Pins 42 and 43 are securely fastened to the support beam and act as trunnions about which the bellcranks pivot. The pins are located on either side of the vertical center line of the engine with the longitudinal axis of each pin canted away from the vertical center line. The bellcranks thus rotate in oppositely directed planes which are generally tangential to the circumference of the engine, allowing the linkage to be stowed within recesses 32 and 33 in the blocker doors. This permits the radial dimension of the reverser assembly in its stowed or nonoperative position to be held to a minimum. Binding between the links, bellcranks and the crank arms during movement of the blocker doors is prevented by providing spherical ball joints at connections 44—47 and by inserting a hinged joint 48 and 49 in each of the respective crank arms. This allows free pivotal movement of the bellcranks and crank arms in different planes since pins 42 and 43 are not parallel to pin 13. Hinged joints 48 and 49 allow one degree of freedom of movement of the linkage independently of the blocker doors. This helps minimize the radial height of the linkage system and allows radial expansion and contraction of the blocker doors due to thermal differences. Butt plates 51 and 52 are attached to each crank arm adjacent connections 44 and 45. These butt plates provide an abutting surface between them when the reverser is in the reverse thrust position as shown in FIG. 2. The butt plates minimize the stresses in the pin 13, hinges 48 and 49 and the crank arms as a result of reversed thrust loading.

Referring again to FIGS. 3 and 4, the monorail extension 22 of the upper beam 19 includes two oppositely directed channel members 53 and 54 spaced apart in back-to-back relation by upper and lower plates 55 and 56. A trolley 57 is secured to the radially outer end of pin 13 and includes a yoke 58 which carries a pair of anti-friction rollers 59 and 61. The yoke straddles the monorail with the rollers received in the channel members. The rollers ride on the inner surfaces of the channel members and support the blocker doors at all positions of the reverser. The trolley also transmits vertical loads from the blocker doors to the support beam when the reverser is in its extended or reverse thrust position.

In the operation of the present invention hydraulic fluid is supplied to the actuators 15 and 16 at the rod ends of the pistons (not shown). The pistons are forced to the left in FIG. 1, thus retracting the piston rods 36 within the actuators and pulling the sliders 37 aft on tracks 38. Links 39 and 41 then force the bellcranks 34 and 35 to rotate about pins 42 and 43. Pivot points 44 and 45 move aft, causing trolley 57 to slide on monorail 22 and translate the blocker doors rearwardly. At the same time, points 44 and 45 are moved towards each other pulling crank arms 29 and 31 together and rotating the blocker doors about pins 13 and 14. This motion continues until the trolley reaches the end of its travel along the monorail and the downstream edges 25 and 26 of the blocker doors abutt each other. At the same time butt plates 51 and 52 contact each other as previously stated. The reverser is then in its reverse thrust position. In this position the axial forces imposed on the blocker doors by the gas streams are reacted by the crank arms and bellcranks in tension. The axial load of the gas streams is transmitted through the pins 42 and 43, to the support beam and then to the engine structural frame. The blocker doors are supported vertically by the support beam 19 through the trolley and monorail. The doors are supported horizontally by the actuating linkage, moments resulting from side loads being reacted through the pins 42 and 43 and the links 39 and 41.

While the thrust reverser has been illustrated in connection with an aft fan engine it is not limited to use with such an engine, but may be applied to a turbojet engine.

Obviously many modifications and variations of the present invention are possible in the light of the above teachings. It is therefore to be understood that within the scope of the appended claims, the invention may be practiced otherwise than as specifically described.

What I claim is:

1. A two position thrust reverser for deflecting the exhaust gases of an aircraft jet engine, comprising: a support beam adapted to be connected to the engine; a pair of blocker doors pivotally interconnected, the doors being supported from the support beam for translation along the same; a motion multiplying linkage for rotating and translating the doors from their non-operative to their reverse thrust position, the linkage including a pair of bellcranks pivotally mounted on the support beam and a pair of crank arms, each crank arm connecting a blocker door to one of the bellcranks, a single actuator connected to at least one of said bellcranks and forming a toggle joint therewith for actuating the doors simultaneously whereby the doors are translated substantially rearward when moving from their non-operative to their reverse thrust position.

2. A thrust reverser for deflecting the exhaust stream of a jet engine, comprising: a support structure adapted to be connected to a jet engine; a blocker door assembly including a pair of blocker doors, means defining a pair of crank arms each connected at one end to one of said blocker doors and having one end free, pivot means connecting to each said crank arm means intermediate the ends thereof to support each of said blocker doors for pivotal movement about an axis substantially normal to the line of undeflected engine exhaust flow, said blocker doors and pivot means being free for translatory movement along said undeflected exhaust flow line, means for controlling such pivotal and translatory movement of said blocker doors including a pair of link members each having one end pivotally connected to said free end of one of said crank arm means and its other end pivotally connected to said support structure; and a single actuator connected between said blocker door assembly and said fixed support structure for rotating and translating said blocker doors between their normal and reverse thrust positions whereby the doors are translated substantially rearward when moving from their normal to their reverse thrust positions.

3. A thrust reverser for deflecting the exhaust stream of a jet engine, comprising: reverser support structure adapted to be connected to a jet engine; a blocker door assembly including a pair of blocker doors, pivot means mounting each of said blocker doors for pivotal movement about an axis substantially normal to the line of undeflected engine exhaust flow, said blocker doors and pivot means being free for translatory movement along said undeflected exhaust flow line, linkage mechanism including a pair of crank members and a pair of link members for controlling pivotal and translatory movement of said blocker doors, each said crank member having at one end a connection to one of said blocker doors such that the free end of the crank member moves oppositely to the blocker door upon pivotal movement thereof, each said link member having one end pivotally connected to said free end of one of said crank members and its other end pivotally connected to said support structure; and a single actuator connected between said support structure and said blocker door assembly for rotating and translating said blocker doors between their normal and reverse thrust positions whereby the doors are translated substantially rearward when moving from their normal to their reverse thrust position.

4. A thrust reverser for deflecting the exhaust stream of a jet engine, comprising: reverser support structure adapted to be connected to a jet engine; a blocker door assembly including a pair of blocker doors, pivot means mounting each of said blocker doors for pivotal movement about axes substantially normal to the line of undeflected engine exhaust flow, said blocker doors and pivot means being free for translatory movement along said undeflected exhaust flow line, linkage mechanism including a pair of crank members and a pair of link members and a pair of butt members for controlling pivotal and translatory movement of said blocker doors, each said crank member having at one end a connection to one of said blocker doors such that the free end of the crank member moves oppositely to the blocker door upon pivotal movement thereof, each said link member having one end pivotally connected to said free end of one of said crank members and its other end pivotally connected to said support structure, said butt members limiting movement of said blocker door assembly in the reverse thrust position thereof; and a single actuator connected between said support structure and said blocker door assembly for rotating and translating said blocker doors between their normal and reverse thrust positions whereby the doors are translated substantially rearward when moving from their normal to their reverse thrust positions.

5. A thrust reverser for deflecting the exhaust stream of a jet engine, comprising: reverser support structure adapted to be connected to a jet engine; a blocker door assembly including a pair of blocker doors, pivot means mounting each of said blocker doors for pivotal movement about an axis substantially normal to the line of undeflected engine exhaust flow, said blocker doors and pivot means being free for translatory movement along said undeflected exhaust flow line, linkage mechanism including a pair of crank members and a pair of bellcranks for controlling pivotal and translatory movement of said blocker doors, each said crank member having at one end a connection to one of said blocker doors such that the free end of the crank member moves oppositely to the blocker door upon pivotal movement thereof, each said bellcrank at one of its pivot points being connected to said support structure and at a second of its pivot points being connected to said free end of one of said crank members; and a single actuator connected between said support structure and at least one of said bellcranks at its third pivot point and forming a toggle joint therewith for effecting door movement between normal and reverse thrust positions whereby the doors are translated substantially rearward when moving from their normal to their reverse thrust positions.

6. A thrust reverser for deflecting the exhaust stream of a jet engine, comprising: fixed support structure including a support beam adapted to be connected to a jet engine with the longitudinal axis of the beam generally paralleling the direction of undeflected engine exhaust flow; a blocker door assembly including a pair of blocker doors, means mounting said blocker doors to said support beam for pivotal movement of each of the blocker doors about an axis substantially normal to the longitudinal axis of said beam and for translatory movement along the longitudinal axis of said beam, means for controlling such pivotal and translatory movement of said blocker doors including a pair of crank members and a pair of link members, each said crank member having at one end a connection to one of said blocker doors such that the free end of the crank member moves oppositely to the blocker door upon pivotal movement thereof, each said link member having one end pivotally connected to said free end of one of said crank members and its other end pivotally connected to said fixed support structure; and a single actuator connected between said blocker door assembly and said fixed support structure for rotating and translating said blocker doors between their normal and reverse thrust positions whereby the doors are translated substantially rearward when moving from their normal to their reverse thrust positions.

References Cited in the file of this patent

UNITED STATES PATENTS

| | | |
|---|---|---|
| 2,620,622 | Lundberg | Dec. 9, 1952 |
| 2,681,548 | Kappus | June 22, 1954 |
| 2,715,312 | Brame | Aug. 16, 1955 |
| 2,780,058 | Beale et al. | Feb. 5, 1957 |
| 2,803,944 | Kroon | Aug. 27, 1957 |
| 2,831,319 | Geary | Apr. 22, 1958 |
| 2,839,891 | Drakeley | June 24, 1958 |
| 2,968,150 | Goebel et al. | Jan. 17, 1961 |

FOREIGN PATENTS

| | | |
|---|---|---|
| 778,008 | Great Britain | July 3, 1957 |